United States Patent [19]

Perez

[11] 4,383,664
[45] May 17, 1983

[54] VIBRATION SUPPRESSING TRUNK FINGERS FOR AIR CUSHION DEVICES

[75] Inventor: David J. Perez, Xenia, Ohio

[73] Assignee: The United States of America as represented by the Secretary of the Air Force, Washington, D.C.

[21] Appl. No.: 938,993

[22] Filed: Sep. 1, 1978

Related U.S. Application Data

[63] Continuation of Ser. No. 833,777, Sep. 16, 1977, abandoned.

[51] Int. Cl.³ .......................... B60V 3/08; B60V 1/16; B64C 25/32
[52] U.S. Cl. .............................. 244/100 A; 114/67 A; 180/124; 180/127
[58] Field of Search ............. 244/100 R, 100 A, 23 R; 114/67 A; 180/119, 124, 127, 129

[56] References Cited

U.S. PATENT DOCUMENTS

| | | | |
|---|---|---|---|
| 3,258,080 | 6/1966 | Williams et al. | 180/127 |
| 3,379,271 | 4/1968 | Hopkins et al. | 180/127 |
| 3,400,779 | 9/1968 | Grace | 180/127 |
| 3,512,603 | 5/1970 | Crewe et al. | 180/127 |
| 3,524,517 | 8/1970 | La Fleur | 180/124 |
| 3,756,343 | 9/1973 | Joyce | 180/127 |
| 3,894,609 | 7/1975 | Wulf | 244/100 A X |
| 3,921,753 | 11/1975 | Pont | 180/127 |
| 4,019,698 | 4/1977 | Earl | 244/100 A X |

FOREIGN PATENT DOCUMENTS 1300978 12/1972 United Kingdom ................. 180/127

Primary Examiner—Charles E. Frankfort
Attorney, Agent, or Firm—Donald J. Singer

[57] ABSTRACT

In an aircraft air cushion takeoff and landing system with a flexible trunk section in the form of a large expandable tube, having multiple air exhaust holes in the bottom thereof, encircling the bottom of the fuselage, a group of flexible finger-like protrusions beneath the forward section of the trunk. The downwardly extending finger-like protrusions make intermittent contact with the ground surface to suppress vertical vibrations in the trunk when the aircraft is hovering at ground level with the trunk inflated.

4 Claims, 7 Drawing Figures

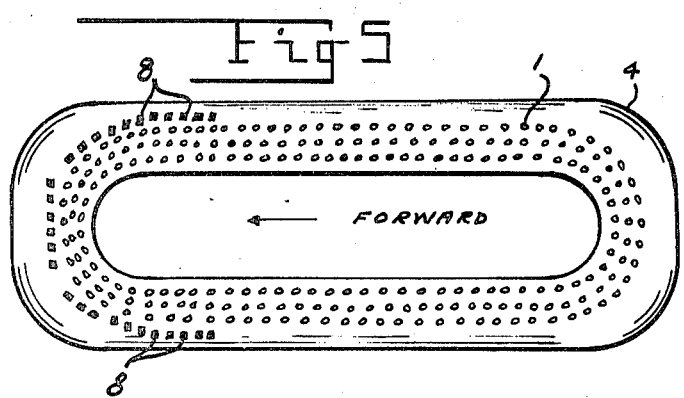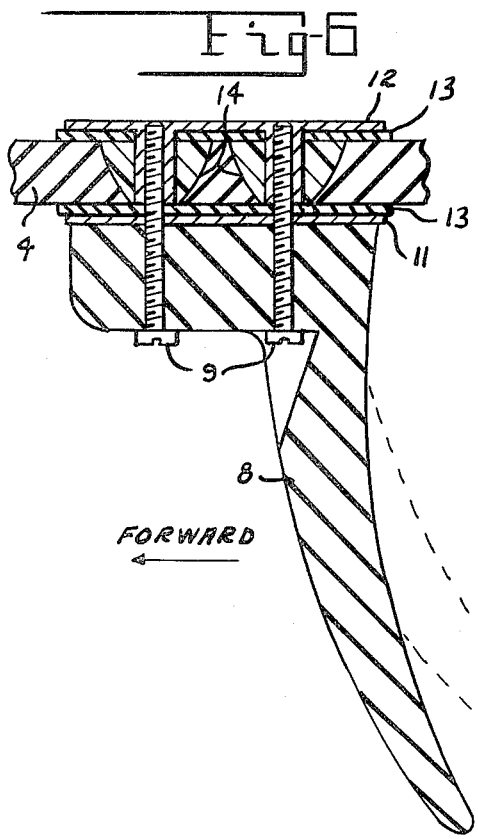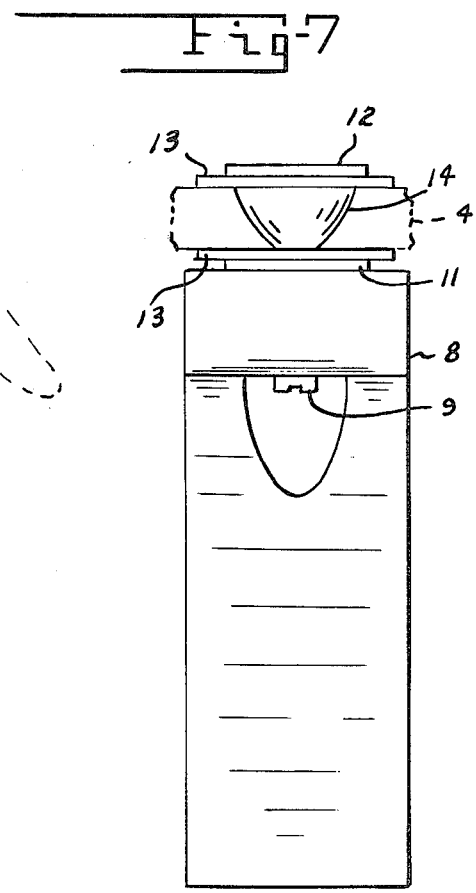

VIBRATION SUPPRESSING TRUNK FINGERS FOR AIR CUSHION DEVICES

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application is a continuation of copending application Ser. No. 833,777 filed on Sept. 16, 1977, now abandoned.

BACKGROUND OF THE INVENTION

This invention relates generally to air cushion vehicles and more particularly to a vibration suppressing means for an aircraft installed air cushion type takeoff and landing system having an inflatable trunk configuration. Conceptually the use of an air cushion to support a vehicle above the ground is well known in the technology. Examples of classical approaches to confining a pocket of air beneath vehicles are disclosed in U.S. Pat Nos. 3,172,494; 3,208,543; 3,283,355; 3,297,102; 3,353,617; 3,400,779; 3,877,542 and 3,891,047.

One recent refinement of the air cushion technique consists of using a structure generally referred to as a trunk to provide both the air duct and seal for the air cushion. The trunk is a large inflatable tube encircling the bottom of the vehicle, having at its lowest surface multiple air passage holes through which pressurized air from inside the tube both supplies the cavity formed and acts directly on the ground beneath. The air used to inflate the trunk and eventually pressurize the cavity is normally supplied by a motor driven fan.

The use of an inflatable trunk to perform the function of both an air duct and a seal is especially important in aircraft applications as a takeoff and landing system. Prior to the development of such trunks, substantial power requirements, approaching that of a vertical takeoff type aircraft, were necessary to provide a practical hoverheight distance between the ground and the aircraft's hard structure. In fact, this was the major shortcoming in the development of early air cushion type takeoff and landing systems.

In a typical aircraft application the trunk is deflated, and thereby retracted to the aircraft fuselage, during normal flight to reduce aerodynamic drag. The trunk is inflated for takeoff and landing, by introducing air from a compressing fan, to obtain the benefits of air cushion flotation, such as low ground overpressure. Using the inflatable trunk approach to air cushion support provides an aircraft hoverheight adequate to transverse most obstacles, in cases up to ⅔ of the trunk depth, without increasing the daylight clearance or lift power.

During the recent evaluation of such a trunk type air cushion takeoff and landing system, a number of aeromechanical performance degrading phenomena were encountered. The invention addresses itself to the correction of one such problem, generally categorized as a vertical vibration or flutter of the trunk structure appearing when the air cushion supported aircraft travels at ground level over any smooth hard surface, such as a runway. Unsuppressed vibrations significantly reduce the operational life of the flexible trunk, causing surface splitting and internal delamination.

A variety of techniques were attempted to suppress or measurably dampen the trunk vibrations. With the exception of the invention disclosed herein, they proved to be of limited success. Mounting rubber strakes along the outer lateral edges of the trunk bottom, attaching mass type damper weights to the trunk sides, installing diaphragms internal to the trunk tube, and shifting of the aircraft's center of gravity describe the significant techniques considered and tested. Though some did suppress or moderate vibrations under limited conditions, detrimental secondary effects, such as wear damage to the trunk, unstable heaving of the aircraft and constraints on trunk pressure, preclude their operational implementation as solutions to the vibration problem.

BRIEF SUMMARY OF THE INVENTION

According to this invention, multiple, flexible finger-like devices are attached beneath the forward section of the trunk used in an air cushion takeoff and landing system for aircraft. When the flexible trunk is inflated and the aircraft is being supported at ground level by the air cushion system, the finger-like devices make intermittent contact with the ground and effectively suppress vertical vibrations in the trunk structure.

BRIEF DESCRIPTION OF THE DRAWINGS

FIG. 5 displays the trunk as seen from below, with air passages and finger-like device locations visible.

FIG. 6 is a cross-sectional view of a finger-like device and its associated hardware.

FIG. 7 shows the forward aspect of the device in FIG. 5.

DETAILED DESCRIPTION OF THE INVENTION

Figure 1:
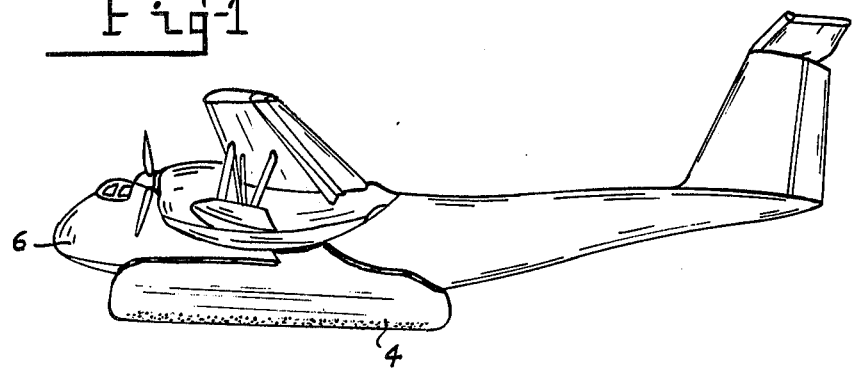
FIGS. 1 and 2 show an aircraft having an air cushion takeoff and landing system with the trunk inflated and retracted, respectively.
Figure 2:
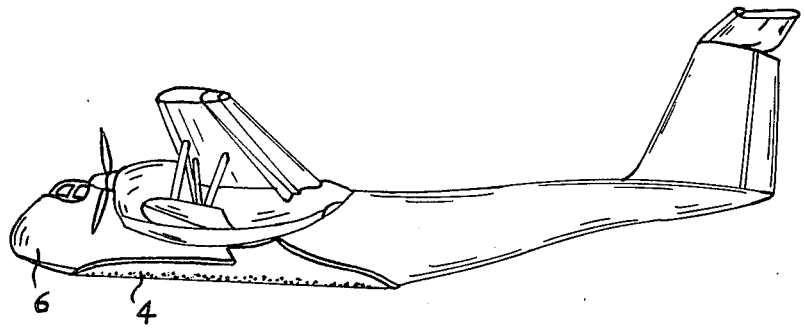

Shown in FIG. 1 is an aircraft having a trunk type takeoff and landing system, with the trunk inflated. When not inflated, the trunk retracts to the outer skin of the fuselage by action of the trunk material elasticity, see FIG. 2, to minimize the aircraft's aerodynamic drag.

Figure 3:
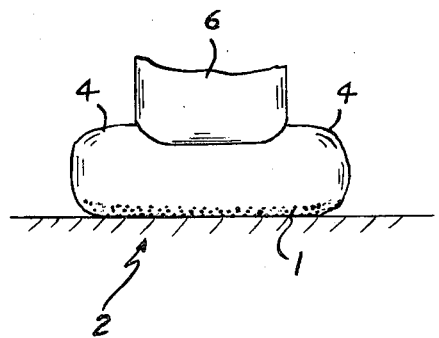
FIG. 3 shows the profile of the inflated trunk when viewed from the front.
Figure 4:
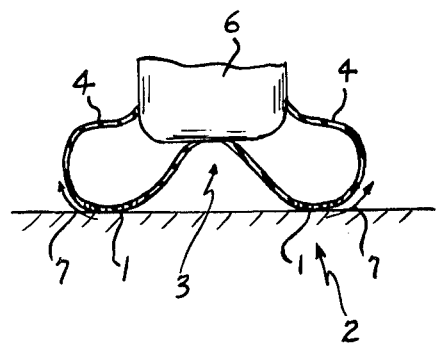
FIG. 4 is a schematic diagram showing the profile of the trunk section midway along the aircraft axis.

FIGS. 3 and 4 contain schematic diagrams which display the profile of the trunk when inflated. FIG. 3 is a forward aspect view showing some of the multiple air exhaust holes 1 which act to create the air cushion effect. The diagram in FIG. 4 is a sectional taken about midway along the axis of the aircraft. The implementation of the air cushion phenomena becomes more apparent from FIG. 4, recognizing that much of the pressurized air flow from holes 1 enters cavity 3 formed by trunk 4, aircraft fuselage 6 and ground 2.

Leakage air 7 around the periphery of trunk 4, acting in concert with flexible trunk 4, produces the aeromechanical phenomena appearing as a vertical vibration or flutter of the trunk. As noted previously, this vibration accelerates fatigue failure of the flexible trunk, exhibiting itself as splitting or delamination of the trunk material. The interaction between leakage air 7 and flexible trunk 4 appears as a dominant problem only when the aircraft is over a hard, smooth surface, such as a paved runway.

The invention as embodied by the forthcoming description has shown that it can successfully suppress such vibrations, and do so without introducing detrimental secondary effects into the operation of the air cushion system. Flexible finger-like devices 8 are attached beneath the forward section of trunk 4 as shown in FIG. 5, FIG. 5 being an inflated trunk viewed from below. Intermittent contact between finger-like devices 8 and the ground surface dampen and effectively suppress vertical vibrations around the whole of the trunk periphery.

Shown in FIGS. 6 and 7 are two aspects of one of the devices and the typical hardware used for mounting such devices to the trunk structure. Referring now to FIG. 6, hard but flexible rubber device 8 is attached beneath trunk 4 using two screws 9 which pass through metallic backing plate 11 and are threaded into extensions of metallic backing plate 12. Intermediate flexible sheet materials 13 reduce contact wear between the two backing plates, 11 and 12, and trunk 4, and to a lesser degree spread forces over a larger segment of trunk material.

Conically shaped spacers 14 compensate for the extreme elongations occurring in trunk 4 during inflation, typically reaching 300%. As the trunk is inflated, the holes through which device 8 is attached attempt to separate while the thickness of trunk material 4 decreases. Installation of conical spacers 14 causes trunk material 4 to slide downward along spacers 14 and thereby maintain continued mechanical communication between finger-like device 8 and trunk 4. Device 8 is thereby maintained in a vertical orientation.

The relative locations of the finger-like devices on the lower surface of the trunk are shown in FIG. 5. Their orientation with respect to the forward motion of the aircraft is given in FIG. 6, with the exception of three each forming the left and right front corners, see FIG. 5, which are rotated 45 degrees from the forward direction. Flexure of finger-like device 8 is described by the dashed outline in FIG. 6. Attachment points for the devices are selected within the boundaries defined by the two requirements: (1) when the trunk is deflated the devices retract to positions of close proximity, for minimum aerodynamic drag, and (2) when the trunk is inflated the devices extend downward from locations near the periphery of the trunk bottom.

While the invention has been shown and described In a particular embodiment, those skilled in the art will readily recognize that variations in form and material may be made without departing from the spirit or scope of the invention.

I claim:
1. In an aircraft mounted air cushion takeoff and landing system of the type using an inflatable trunk as the confining means for the air cushion, the improvement which comprises:
   (a) multiple flexible noninflatable finger-like protrusions; and
   (b) means for attaching each of said protrusions to the bottom of the trunk such that said each protrusion extends downward when the trunk is in an inflated state to a distance sufficient to make intermittent contact with the surface beneath and suppress vertical aero-mechanical vibrations in the trunk;
   (c) said protrusions being sufficiently spaced relative to each other to allow unobstructed flow of leakage air from the cavity formed by the trunk;
   (d) said attaching means including
      (i) a pair of metal backing plates disposed on opposite inner and outer sides of the material of the trunk,
      (ii) a pair of fasteners being threaded into the one plate on said inner side of said trunk material for attaching said each protrusion to the other plate on said outer side of said trunk material, and
      (iii) a pair of spacers inserted about said fasteners between said plates and received through holes in said trunk material for maintaining mechanical communication between the trunk material and said each protrusion so as to maintain the latter in a downward orientation when the trunk is in an inflated state in which the cross-sectional thickness of its material is reduced.

2. The apparatus described in claim 1, wherein said protrusions are located on the forward section of the trunk.

3. The apparatus described in claim 2, wherein said protrusions have a preferred direction of flexure toward the rear of said aircraft.

4. The apparatus described in claim 1, wherein said attaching means further comprises:
   (iv) a pair of flexible material sheets, each being disposed between one of said backing plates and the adjacent side of the trunk material for reducing contact wear between said backing plates and the trunk.

* * * * *